United States Patent
Zell et al.

(10) Patent No.: US 8,364,348 B2
(45) Date of Patent: Jan. 29, 2013

(54) METHOD AND DEVICE FOR DETERMINING A STEERING ANGLE OFFSET

(75) Inventors: Andreas Zell, Nürnberg (DE); Jörg Grotendorst, Nürnberg (DE)

(73) Assignee: Continental Teves AG & Co. oHG (DE)

( * ) Notice: Subject to any disclaimer, the term of this patent is extended or adjusted under 35 U.S.C. 154(b) by 660 days.

(21) Appl. No.: 12/522,431

(22) PCT Filed: Dec. 20, 2007

(86) PCT No.: PCT/DE2007/002298
§ 371 (c)(1),
(2), (4) Date: Jan. 20, 2010

(87) PCT Pub. No.: WO2008/086767
PCT Pub. Date: Jul. 24, 2008

(65) Prior Publication Data
US 2010/0138110 A1    Jun. 3, 2010

(30) Foreign Application Priority Data

Jan. 18, 2007 (DE) .......................... 10 2007 002 708

(51) Int. Cl.
*A01B 69/00* (2006.01)
*B62D 6/00* (2006.01)
(52) U.S. Cl. .......................................... 701/41; 701/36
(58) Field of Classification Search .................. None
See application file for complete search history.

(56) References Cited

U.S. PATENT DOCUMENTS

| 5,311,432 | A | 5/1994 | Momose |
| 5,948,030 | A * | 9/1999 | Miller et al. ................... 701/41 |
| 6,810,311 | B2 | 10/2004 | Winner et al. |
| 2003/0212476 | A1 | 11/2003 | Aanen et al. |
| 2004/0024565 | A1 | 2/2004 | Yu et al. |
| 2004/0061500 | A1 | 4/2004 | Lou et al. |
| 2004/0117088 | A1 | 6/2004 | Dilger |
| 2010/0010701 | A1 * | 1/2010 | Gartner ........................ 701/29 |

FOREIGN PATENT DOCUMENTS

| DE | 44 19 364 A1 | 12/1995 |
| DE | 692 17 540 T2 | 9/1997 |
| DE | 102 05 971 A1 | 11/2002 |

* cited by examiner

*Primary Examiner* — F. Zeender
*Assistant Examiner* — Christopher Buchanan
(74) *Attorney, Agent, or Firm* — RatnerPrestia

(57) ABSTRACT

A method for determining a steering angle offset (LWO) in a vehicle having a steering unit and a steering angle sensor. A first frequency distribution (HV1) of the steering angle (LW) is determined over a number of steering angles according to at least one dynamic vehicle parameter (Q, G, V), and the average value (MW1) of the steering angle (LW) is determined from the first frequency distribution (HV1). The next step tests whether the steering angle (LW) in the first frequency distribution (HV1) is distributed symmetrically around the average value (MW1) and, when there is symmetry of the first frequency distribution (HV1) around the average value (MW1), the first frequency distribution (HV1) is carried over into a second frequency distribution (HV2). When the overall number of steering angles (LW1) in the second frequency distribution (HV2) exceeds a prespecified threshold value (S), the steering angle offset (LWO) is determined from the average value (MW2) of the second frequency distribution (HV2). A device for determining a steering angle offset (LWO) in a vehicle by way of such a method is also described.

8 Claims, 2 Drawing Sheets

METHOD AND DEVICE FOR DETERMINING A STEERING ANGLE OFFSET

CROSS REFERENCE TO RELATED APPLICATIONS

This application is the U.S. national phase application of PCT International Application No. PCT/DE2007/002298, filed Dec. 20, 2007, which claims priority to German Patent Application No. DE102007002708.9, filed Jan. 18, 2007, the contents of such applications being incorporated by reference herein.

BACKGROUND OF THE INVENTION

1. Field of the Invention

The invention relates to a method and a device for determining a steering angle offset.

2. Description of the Related Art

The steering angle sensors used in a vehicle are subject to a certain tolerance when being installed in the vehicle, i.e., their zero position is not exactly adjusted. At high driving speeds, however, even a small deviation of the steering angle sensor can lead to great deviations of the calculated results if the steering angle measured is used, e.g. in vehicle dynamics algorithms within an electronic stability program or in a chassis control system; therefore the error in respect of the zero position has to be determined and taken into account in the calculation.

This can be done by means of a learning algorithm while driving. Usually it is assumed that, on average, the driver drives in a straight line, i.e. the average steering angle should be zero. As a rule, a long-term average is calculated from the steering angles measured in order to determine the deviation from the exact zero position.

This simple method has the drawback, in particular, that the above-assumption is not true in many cases, e.g. if a vehicle is moved regularly between a person's home and workplace and is always turned around in the same direction at the end points while the route chosen for the outward journey and the journey back is always the same, which results in an average steering angle value of 360° in total.

SUMMARY OF THE INVENTION

An object of the invention is to provide a method of determining a steering angle offset which allows easy, rapid and reliable determination of the steering angle offset in a vehicle.

According to at least one aspect of the invention, this object is achieved by a method for determining a steering angle offset in a vehicle having a control unit and a steering angle sensor, the data used to calculate the steering angle offset are pre-selected by first determining a first frequency distribution of the steering angle over a number of steering angle values measured. This is done depending on at least one dynamic vehicle parameter. In this way, driving situations are excluded in which, with high probability, the driver does not drive in a straight line, on average. In the next step, the average value of the steering angle is determined from the first frequency distribution. It is then checked whether the steering angle values measured in the first frequency distribution are distributed symmetrically around the average value calculated and, if there is symmetry of the first frequency distribution around the average value within a predefined tolerance limit, the measured values of the first frequency distribution are carried over into a second frequency distribution. The overall number of the steering angle values measures in the second frequency distribution, is, in particular, the sum of the number of steering angle values of the first frequency distribution carried over. If there is no symmetry of the first frequency distribution around the average value calculated within the p redefined tolerance limit, all measured values of the first frequency distribution are discarded, and a new first frequency distribution is determined. When the overall number of steering angles in the second frequency distribution exceeds a predefined threshold, the steering angle offset is determined from the average value of the second frequency distribution. This two-stage method including a pre-selection of measured values by taking into account only those driving situations corresponding to approximate straight-line driving advantageously improves the exactness of the steering angle offset calculated.

Since the number of measured values in the second frequency distribution increases continuously while the number range available for the number of measured values in the second frequency distribution is possibly limited, the second frequency distribution must be rescaled, either regularly or when the number range available is at risk to be exceeded, in order that measured values from the first frequency distribution can continue to be carried over into the second frequency distribution. This is done by multiplying the whole second frequency distribution with a factor that is preferably between zero and one.

The determination of the first frequency distribution wherein the at least one dynamic vehicle parameter is the lateral acceleration (Q), the yaw rate (G) or vehicle speed (V) limits the driving situations from which a steering angle is included into the first frequency distribution to those driving situations corresponding to approximate straight-line driving during the whole time of measured value acquisition for the first frequency distribution.

The determination of the first frequency distribution wherein the steering angles (LW) measured are classified into steering angle classes (i) having a width ($a_i$) and a corresponding frequency ($y_i$) results in a simple display of the distribution, which requires only few calculations, in particular.

Limitation of the width of the steering angle class in a range of between 0.5 and 2.0 angular degrees enables the steering angle offset to be determined with sufficient exactness while the number of calculations required is moderate.

The check for symmetry of the first frequency distribution as described hereinafter is a further pre-selection of driving situations corresponding to approximate straight-line driving during the whole time of measured value acquisition for the first frequency distribution.

The exactness of the method can be varied by predefining the tolerance value by multiplying a factor r with the arithmetic average of $y_{1+k}$ and $y_{1-k}$, and that the factor r is between 0.3 and 0.6.

A method according to some aspects of the invention allows continuous improvement when determining the steering angle offset, in particular.

A method according to some aspects of the invention prevents failure of the method when the number range available is exceeded, in particular.

It is another object of at least one aspect of the invention to provide a device for carrying out an easy, rapid and reliable method for determining a steering angle offset in a vehicle.

The advantages of the inventive device correspond to those stated above in respect of the method according to the invention.

BRIEF DESCRIPTION OF THE DRAWINGS

Further advantages and features of the invention will be apparent from the following description of an exemplary embodiment of the invention with reference to the drawings in which.

DETAILED DESCRIPTION OF THE PREFERRED EMBODIMENTS

Figure 1:
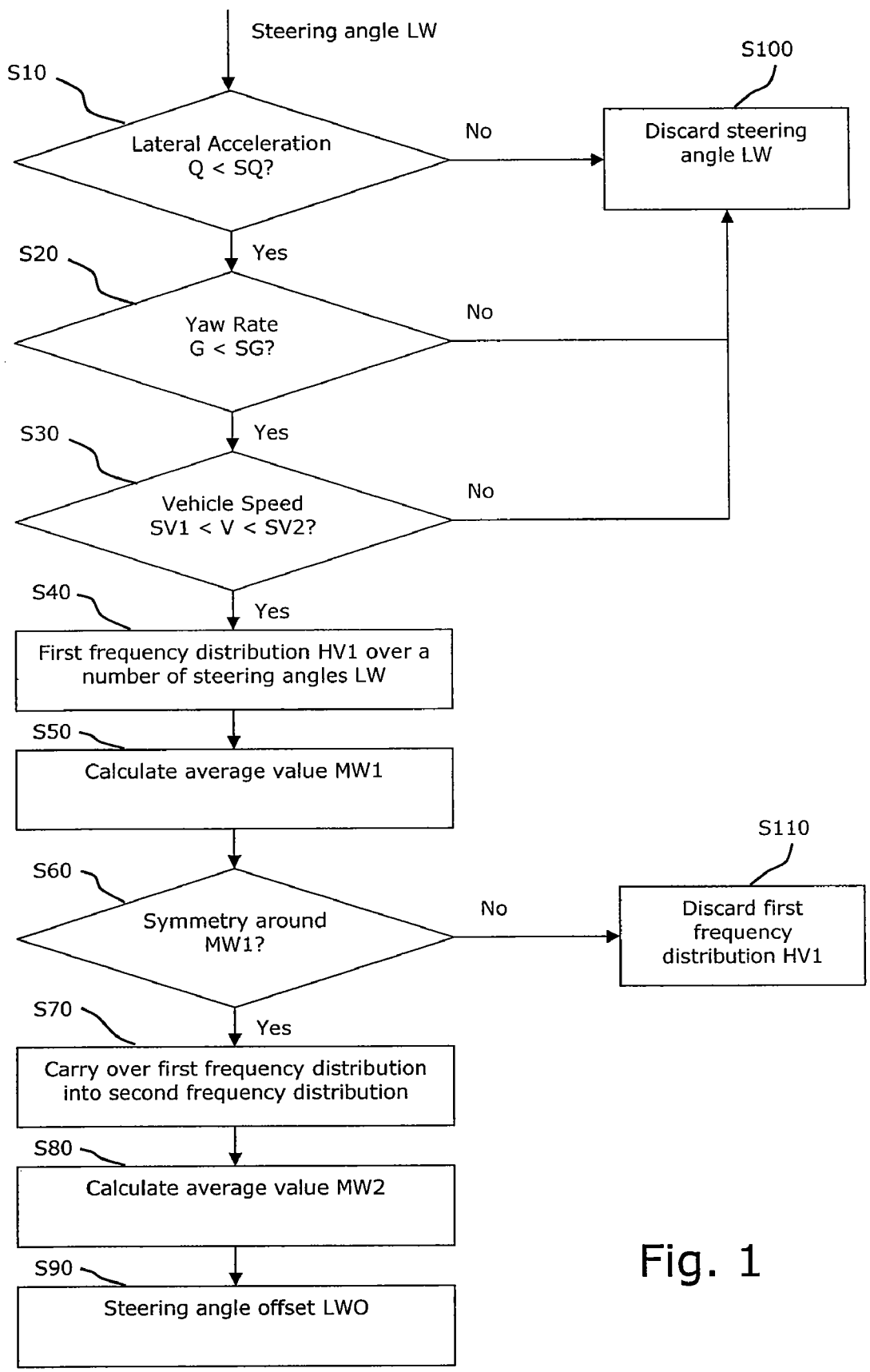
FIG. 1 shows a flow diagram for determining a steering angle offset.

The flow diagram shown in FIG. 1 shows a method for determining a steering angle offset LWO in a vehicle, wherein the measures taken in steps S10, S20 and S30 exclude driving situations in which, with high probability, the driver does not drive in a straight line, on average. The steering angle LW is determined, and in step S10 it is checked whether the lateral acceleration is below a predefined value SQ. If this is not the case, it is deduced that the vehicle does not drive in a straight line, and the measured value of the steering angle LW is discarded in step S100.

If the above condition is fulfilled, it is checked in the next step S20 whether the yaw rate is below a predefined value SG. The yaw rate or yaw velocity in a vehicle is the angular speed during rotary motion of the vehicle around its vertical axis. If G is above SG, it is deduced that the vehicle, with high probability, does not drive in a straight line, and the measured value of the steering angle is discarded in step S90.

If the condition of step S20 is fulfilled, it is checked in the next step S30 whether the vehicle speed V is in a predefined speed range of between SV1 and SV2. In this way, the condition for detecting the steering angle LW can, for example, be limited to driving situations outside of built-up areas.

As soon as a certain number of steering angles LW have been detected, e.g. a number of 1,000, a first frequency distribution HV1 for the steering angle LW is produced from these 1,000 measured values in step S40. A simple kind of distribution is a discrete distribution. For this purpose, the steering angles LW are classified into steering angle classes i having the width $a_i$ and the corresponding frequency $y_i$ when producing the first frequency distribution HV1. The width $a_i$ is in the range of between 0.5 and 2.0 angular degrees, in particular. A width of 1.4 angular degrees has found to be particularly advantageous. It is also possible to limit the overall width measured in angular degrees of the first frequency distribution HV1. Preferably the overall width measured in angular degrees of the first frequency distribution HV1 is approximately +5 angular degrees; a range of +10 angular degrees would also be conceivable.

In step S50, the average value MW1 is calculated from the steering angles LW of the first frequency distribution HV1. Subsequently it is checked in step S60 whether the first frequency distribution HV1 is arranged symmetrically around the average value MW1 except for the predefined tolerance. If this is not the case, the frequency distribution HV1 is discarded in step S110.

If there is symmetry of the frequency distribution HV1 around the average value MW1, the frequency distribution HV1 is carried over into a second frequency distribution HV2 in step S70. The number of steering angles LW included in the second frequency distribution HV2 is then equal to or higher than the number of steering angles LW from the first frequency distribution HV1. As a rule, the number of steering angles LW in the second frequency distribution HV2 will be an integral multiple of the first frequency distribution HV1 or, in general, the sum of the number of steering angles LW from all first frequency distribution HV1 carried over. As soon as the overall number of steering angles LW in the second frequency distribution HV2 exceeds a predefined threshold S, the average value MW2 is calculated from the second frequency distribution HV2 in step S80. The threshold S can be a predefined number, in general a multiple of the steering angles LW included in the first frequency distribution HV1. The threshold can, however, also be predefined by limiting a memory into which the steering angles LW of the second frequency distribution HV2 are read.

If the average value MW2 is calculated to be 1 angular degree, for example, it is determined in step S90 that the steering angle offset LWO relative to the steering angle zero LWN (=steering angle LW is 0 angular degrees) assumed so far is 1 angular degree. This means it is assumed that the steering angle sensor 2 has been turned around by 1 angular degree relative to the zero position of the steering column of the vehicle when installing this steering angle sensor 2, the zero position of the steering column defining straight-line driving of the vehicle.

In order to improve the exactness with which the steering angle offset LWO is determined, the method including steps S10 trough S110 can be carried out continuously. For this purpose, in the current runoff the method the steering angle offset LWO is determined in step S90 using the steering angle offset LWO from the previous run as steering angle zero LWN. In the first run of the method for determining the steering angle offset LWO in step S90, 0 angular degrees is predefined as steering angle zero LWN, as described above. In addition, it is possible to weight the steering angle zero LWN and the average value MW2 calculated in step S80 when calculating the steering angle offset LWO in step S90.

The following table 1 illustrates the continuous calculation of the steering angle offset LWO for the fist three runs using the weighting factor $_{GLWN}$ for the steering angle zero LWN and the weighting factor $(1-_{GLWN})$ for the average value MW2. The angles are given in angular degrees. The weighting factor $_{GLWN}$ for the steering angle zero LWN is 0.8 in this case; the weighting factor $(1-_{GLWN})$ for the average value MW2 is therefore 0.2.

General formula for calculating the steering angle offset LWO:

$$LWO = [(LWN*_{GLWN}) + (MW2*(1-_{GLWN}))]$$

TABLE 1

| Run | Steering angle zero LWN | Average value MW2 | LWO |
|---|---|---|---|
| 1 | 0 | 1.00 | .20 |
| 2 | 0.20 | 1.00 | 0.36 |
| 3 | 0.36 | 1.00 | 0.49 |

Figure 2:
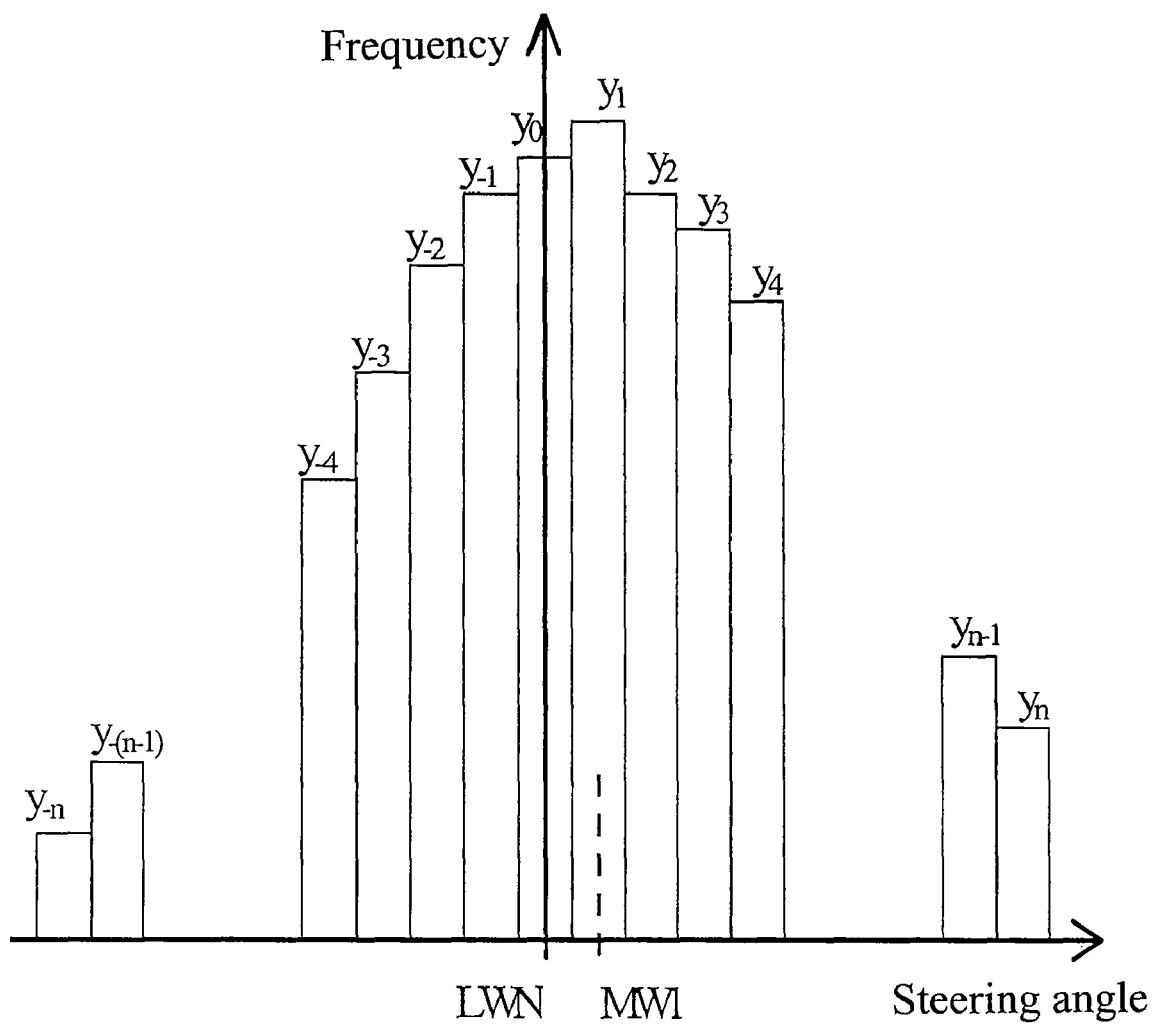
FIG. 2 shows a discrete first frequency distribution of steering angles.

FIG. 2 shows how the check for symmetry of the first frequency distribution HV1 carried out in step S60 is done. First the steering angle class i=1 is determined as the steering angle class containing the average value MW1. It is then checked whether the condition $|y_{1+k} - y_{1-k}| <= tol$. Wherein k=1, 2, 3, ..., n, is fulfilled for the steering angle class pairs (1+k, 1−k) arranged symmetrically around the steering angle class i=1 containing the average value MW1. There is symmetry of the first frequency distribution HV1 if the condition $|y_{1+k} - y_{1-k}| <= tol$ is fulfilled for all n steering angle class pairs. In the formula, tol is a predefined tolerance value which is determined by multiplying a factor r with the arithmetic average of $y_{i+k}$ and $y_{i-k}$. The factor r is preferably between 0.3 and 0.6.

The following table 2 illustrates the check for symmetry of the first frequency distribution HV1, wherein i=1, n=3 and r=0.4:

TABLE 2

| k | $Y_{1+k}$ | $Y_{1-k}$ | Tol | $|Y_{1+k} - Y_{1-k}|$ |
|---|---|---|---|---|
| 1 | 80 | 90 | 34 | 10 |
| 2 | 60 | 80 | 28 | 20 |
| 3 | 50 | 70 | 24 | 20 |

The condition $|y_{1+k} - y_{1-k}| \leq \text{tol}$ is fulfilled for each steering angle pair in this case; the first frequency distribution HV1 is arranged symmetrically around the average value MW1 within the predefined tolerance.

In the above exemplary embodiments, the average was determined arithmetically in each case. However, the invention is not intended to be limited in this respect; it can be carried out very advantageously using root means squares or the like.

In summary, it can be stated that the method described above enables easy and reliable determination of the steering angle offset in a vehicle in a very elegant yet very simple way while disregarding all solutions known so far.

The present invention has been set out by means of the above description in order to explain the principle of the invention and its implementation in practice as best as possible. If modified in a suitable way, however, the invention can of course also be realized by means of numerous other embodiments.

The invention claimed is:

1. A method for determining a steering angle offset in a vehicle having a control unit and a steering angle sensor, comprising the steps of:
    determining, by the control unit, a first frequency distribution of the steering angle over a number of steering angles depending on at least one dynamic vehicle parameter sensed by the steering angle sensor;
    determining, by the control unit, a first average value of the steering angle from the first frequency distribution;
    checking, by the control unit, whether the steering angle in the first frequency distribution is distributed symmetrically around the first average value; and
    if there is symmetry of the first frequency distribution around the first average value, carrying over, by the control unit, the first frequency distribution into a second frequency distribution, the number of steering angles included in the second frequency distribution being equal to or higher than the number of steering angles from the first frequency distribution, and
    when the overall number of steering angles in the second frequency distribution exceeds a predefined threshold, determining, by the control unit, the steering angle offset from a second average value of the second frequency distribution.

2. A method according to claim 1, wherein the at least one dynamic vehicle parameter is the lateral acceleration, the yaw rate or the vehicle speed.

3. A method according to claim 1, wherein the steering angles measured are classified into steering angle classes having a width and a corresponding frequency in order to determine the first frequency distribution.

4. A method according to claim 3, wherein the width is in a range of between 0.5 and 2.0 angular degrees.

5. A method according to claim 3, wherein the following steps are performed in order to check whether there is symmetry of the first frequency distribution around the first average value:
    determining a steering angle class containing the first average value;
    checking whether the condition $|y_{1+k} - y_{1-k}| \leq \text{tol}$, wherein k=1, 2, 3, ..., n is fulfilled for the steering angle class pairs (1+k, 1−k) arranged symmetrically around the steering angle class containing the first average value; and
    establishing that there is symmetry of the first frequency distribution if the condition $|y_{1+k} - y_{1-k}| \leq \text{tol}$ is fulfilled for all n steering angle class pairs, tol being a predefined tolerance value.

6. A method according to claim 5, wherein the tolerance value tol is determined by multiplying a factor r with the arithmetic average of $y_{1+k}$ and $y_{1-k}$, and that the factor r is between 0.3 and 0.6.

7. A method according to claim 1, wherein in the determination of the current value of the steering angle offset, the previous value of the steering angle offset is taken into account, and in the determination of the first value of the steering angle offset the previous value of the steering angle offset is set to zero.

8. A method according to claim 1, wherein the second frequency distribution is rescaled, either regularly or as required, by multiplying all values in the second frequency distribution with a factor.

* * * * *

UNITED STATES PATENT AND TRADEMARK OFFICE
CERTIFICATE OF CORRECTION

PATENT NO. : 8,364,348 B2
APPLICATION NO. : 12/522431
DATED : January 29, 2013
INVENTOR(S) : Zell et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this
First Day of September, 2015

Michelle K. Lee
*Director of the United States Patent and Trademark Office*